United States Patent Office 3,418,323
Patented Dec. 24, 1968

3,418,323
2-CHLORO-6-(TRICHLOROMETHYL)PYRIDINE COMPOUNDS
Howard Johnston, Walnut Creek, and Mary S. Tomita, San Rafael, Calif., assignors to The Dow Chemical Company, Midland, Mich., a corporation of Delaware
No Drawing. Continuation-in-part of application Ser. No. 152,624, Nov. 15, 1961. This application May 16, 1966, Ser. No. 550,129
9 Claims. (Cl. 260—290)

ABSTRACT OF THE DISCLOSURE 2-(trichloromethyl)pyridine compounds are selectively chlorinated at the alpha position at moderately elevated temperature in a homogeneous liquid state in the absence of added water and polar solvent to produce 2-chloro - 6 - (trichloromethyl)pyridine compounds. The compounds are useful as chemical intermediates and as toxic constituents of pesticidal preparations.

---

This application is a continuation-in-part of our prior application Ser. No. 152,624, filed Nov. 15, 1961, and now abandoned.

The present invention relates to an improved process for the production of 2-chloro-6-(trichloromethyl)pyridine compounds.

The 2 - chloro-6-(trichloromethyl)pyridine compounds with which the present invention is concerned have the general formula

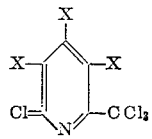

wherein each X is independently selected from the group consisting of hydrogen and chloro. These compounds may also be represented by the formula

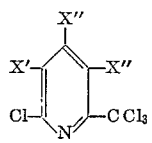

In this and succeeding formulas, each of X', X" and X''' is independently selected from the group consisting of hydrogen and chloro. It is to be noted that the 2 and 6 positions are both α-positions with respect to the hetero nitrogen and in a specific instance by following preferred chemical nomenclature practice, a compound may be identified as having a (trichloromethyl) radical in the 2 rather than the 6 position. The 2-chloro-6-(trichloromethyl)pyridine compounds are useful in biological systems, as chemical intermediates and as toxic constituents of pesticidal preparations. Certain of the compounds are particularly useful as antimicrobials and as insecticides.

Certain ring chlorinated α-(trichloromethyl)pyridine compounds have been reported in the literature. These compounds, prepared by methods wherein α-picoline is chlorinated, have been obtained in mixtures of numerous chlorinated (trichloromethyl)pyridines wherein any one component is usually present in extremely low yields or in amounts too low to report. These preparations have generally been accompanied by large amounts of tar formation. Moreover, such compounds as have been identified have usually been found to have the ring chloro in the 3 or 5 position or in combinations which include these positions. The known processes have generally not resulted in the formation of identifiable α-(trichloromethyl)pyridines which also have a chloro substituent in the other α-position. There is no known method which could be considered a method suitable for the production of such compounds.

The 2-chloro-6-(trichloromethyl)pyridine compounds are for many purposes significantly more useful than isomeric compounds in which there is no chloro substituent in the 2-position. Furthermore, many of the 2-chloro-6-(trichloromethyl)pyridine compounds are important as intermediates for highly useful chemicals. Thus, a preparative method for 2-chloro-6-(trichloromethyl)pyridine compounds is desired. Moreover, a preparative method which has short reaction time, results in high yield of the product, and is unencumbered by the necessity for tedious isolation of the desired product from a crude mixture of reaction products is highly desirable.

It is an object of the present invention to provide a procedure for the preparation of 2-chloro-6-(trichloromethyl)pyridine compounds. It is an object of the present invention to provide a procedure for the preparation of 2 - chloro-6-(trichloromethyl)pyridine compounds which is simple, rapid and practical. Another object of the invention is to provide a method by which high yields of the desired products may be obtained. An additional object is to provide a procedure whereby the desired products may be obtained in relatively high purity, rendering unnecessary any difficult and tedious isolation procedure. Other objects will be evident from the following specification and claims.

It has been discovered that 2-chloro-6-(trichloromethyl)pyridine compounds may be prepared readily and in good yields by a method wherein a 2-(trichloromethyl) pyridine compound having the formula

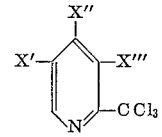

is heated to and maintained in the liquid state and gaseous chlorine passed therethrough. The reaction is carried out in the absence of added water and polar solvent as hereinafter discussed. The reaction may be represented by the following equation:

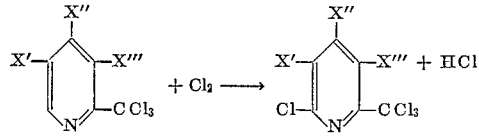

The selective chlorination reaction at the α-position takes place smoothly, rapidly and in good yields with little or no by-product formation and with absence of undesirable tars when efficient contact is provided between the appropriate 2 - (trichloromethyl)pyridine reactant in the liquid state and gaseous chlorine. Thus, for example when 2-(trichloromethyl)pyridine is chlorinated by the process of the present invention, the chlorine preferentially enters the α-position and 2-chloro-6-(trichloromethyl)pyridine is obtained as the major product in good yields instead of isomeric products in which the chlorine preferentially enters the β- or α-positions. Similarly, when 3-chloro-2-(trichloromethyl)pyridine is chlorinated by the process of the present invention, the chlorine preferentially enters the α-position and 3,6-dichloro-2-(trichloromethyl)pyridine is obtained as the major product in good yields instead of the isomeric products in which the chlorine preferentially enters the β- or α-positions. Other illustrations of preferential alpha chlorination may be seen in the working examples.

In carrying out the reaction, the rate of reaction may be increased by raising the temperature moderately above that necessary to maintain the reaction medium in a liquid state but in order to provide for selectivity in chlorination, it is important that rigorous temperature conditions not be employed. The upper temperature limit suitable for achieving the desired selective chlorination at the α-position is about 160° C. The desirable lower limit is determined by the particular starting material. A practical lower limit is considered to be about 100° C. The preferred temperatures for carrying out the reaction varies in part with the particular compound to be prepared and ranges from about 110° C. to about 160° C. With the exception of 2-(trichloromethyl)pyridine itself which is preferably chlorinated to 2 - chloro-6-(trichloromethyl) pyridine in an intermediate temperature range of from about 120° C. to about 135° C., preferably about 135° C., it appears that the less chlorinated reactants have optimum reaction temperatures at the lower end of the overall preferred range whereas the more highly chlorinated reactants have preferred reaction temperatures at the upper end of the preferred range. Thus, for example, the chlorination of 3 - chloro-2-(trichloromethyl)pyridine to produce 3,6 - dichloro - 2 - (trichloromethyl)pyridine appears to proceed best at temperatures between about 110° and 120° C. Similarly, the chlorination of 5 - chloro-2 - (trichloromethyl)pyridine to produce 2,3 - dichloro-6-(trichloromethyl)pyridine appears to proceed best at temperatures in the range of about 120° to 130° C. On the other hand, the chlorination of 3,4,5-trichloro-2-(trichloromethyl)pyridine to produce 2,3,4,5 - tetrachloro-6-(trichloromethyl)pyridine appears to proceed best at temperatures in the range of from about 150° to 160° C. Illustrative of an intermediate chlorination product requiring an intermediate optimum temperature range is the preferred range of about 135° to 145° C. for the chlorination of 3,5 - dichloro - 2 - (trichloromethy)pyridine to 2,3,5-trichloro-6-(trichloromethyl)pyridine.

The reaction is preferably carried out in the presence of actinic radiation such as ultraviolet light. A light source emitting light at wave lengths of from about 2000 to 5000 A. particularly between about 3000 to about 4000 A. is suitable. When the reaction is carried out in the presence of a light source, said light source may double as a source of heat. Commercially available sunlamps are convenient for such use.

The reaction preferably is carried out in the absence of a solvent or diluent. Although certain solvents or diluents may be employed, no useful purpose is accomplished thereby since good results are obtained without their use. If a solvent or diluent is employed, consideration should be given to the nature of the solvent and its boiling point. Thus, low boiling solvents lower reaction temperatures and if employed would cause reduction in reaction efficiency or might necessitate substantial modification of apparatus. Solvents, if employed, should be inert solvents such as hexachlorobutadiene. Solvents with reactive groups such as water or other polar solvents cause side reactions. It is especially to be noted that water which is frequently added in some chlorination processes is to be rigorously avoided.

The rate of chlorine flow and total time for administration thereof are dictated in part by chemical and in part by mechanical requirements. Factors to be considered in determining the most desirable rate include size and/or shape of vessel, mechanical entrainment of product in effluent gases, reaction temperature, mechanical aids for contact efficiency, use of counter-current flow, use of packed column, single pass of gas or recycle, etc. In general, good results may be obtained when the rate of chlorine flow is from about 0.5 to about 3 moles of chlorine per mole of 2-(trichloromethyl)pyridine reactant per hour. It is not intended that higher or lower rates are to be excluded; with proper adjustment of the various factors, as would be evident to the skilled in the art, higher or lower rates may be satisfactory. However, it is considered that the above range embrace the most desirable flow rates. Higher flow rates may lead to excessive reaction and by-product formation, or may result in physical entrainment of product and loss thereof in the effluent gas stream. Lower flow rates may decrease reaction rate to such an extent that additional external heating becomes necessary. It is to be noted that heat source is in part internal, i.e., heat of reaction and in part external, i.e., light and heat radiation.

The total time for the administration of chlorine gas is affected by rate of chlorine flow, total amount of chlorine to be supplied, reaction temperature, etc. The lower limit is, of course, the time necessary to introduce a stoichiometric amount of chlorine to the reaction medium. The upper limit may vary with the particular procedure and conditions employed for carrying out the reaction. When the reaction is carried out in a manner wherein chlorine is recycled, the total amount of chlorine necessary is the stoichiometric amount or slight excess inasmuch as under the temperature conditions above set forth substantially no chlorine is lost or consumed in side reactions. Under these conditions, the time required is that necessary to consume the chlorine supplied. When the reaction is carried out in a single pass of chlorine, intimate contact of chlorine with the reactant 2-(trichloromethyl) pyridine compound is provided by bubbling chlorine gas through the liquid reactant until reaction is substantially complete. Under the preferred temperature conditions for carrying out the reaction, administration of from about two to about ten-fold molar excess is considered a desirable range. Determination of substantial completion of reaction may be made readily by sampling the reaction mixture and applying known techniques such as vapor phase chromatographic analysis. It is to be noted that as the reaction temperatures approach the upper limit, very large excess of chlorine should be avoided to minimize side reactions.

After completion of the reaction, the reaction mixture is allowed to cool to room temperature to recover the 2-chloro-6-(trichloromethyl)pyridine product as a solid. Preferably, the reaction mixture is distilled prior to cooling to obtain a substantially pure product. If desired, further purification procedures may be employed such as fractional distillation and/or recrystallization.

In a preferred method for carrying out this reaction, the appropriate 2-(trichloromethyl)pyridine compound is heated and irradiated with a suitable light source to a temperature in the range of from about 110° C. to about 160° C. and chlorine gas bubbled through the heated reactant at a rate of from about 0.5 mole to about 3 moles per mole of 2-(trichloromethyl)pyridine compound per hour for a time sufficient to substantially complete the reaction. At the end of this period, the reaction mixture is distilled to recover the desired product.

The following examples illustrate the invention but are not to be construed as limiting:

Example 1.—2-chloro-6-(trichloromethyl)pyridine

Thirty-nine grams (0.2 mole) of 2-(trichloromethyl) pyridine was placed in a tubular apparatus and the reactant irradiated and heated with a reflector sun lamp (RS–4 type). When the temperature of the reactant was about 135° C., a stream of chlorine gas was passed therethrough at a rate of about 0.45 mole per hour for 1.5 hours to obtain the desired 2-chloro-6-(trichloromethyl) pyridine product having a molecular weight of 231. Vapor phase chromatographic analysis of the product mixture showed 71 mole percent to be 2-chloro-6-(trichloromethyl)pyridine and unreacted starting material to account for the remaining material.

Example 2.—2-chloro-6-(trichloromethyl)pyridine

In a manner similar to that above described, chlorine gas at a rate of about 0.5 mole per hour was passed into 58.0 grams (0.295 mole) of heated and irradiated 2-(trichloromethyl)pyridine. The administration of chlorine gas was continued for 7.5 hours while the temperature of the reaction medium was maintained in the range of from 120° to 135° C. to produce the desired 2-chloro-6-(trichloromethyl)pyridine product. On cooling the reaction mixture, the product crystallized as a solid having a melting point of 65°–66° C. Infra-red spectral analysis indicated the product having this melting point to be pure 2-chloro-6-(trichloromethyl)pyridine. The yield of the product was 64 grams or 94 percent of theoretical.

Example 3.—3,6-dichloro-2-(trichloromethyl) pyridine

In a similar manner, a stream of chlorine gas at a rate of about 0.4 mole per hour was passed into 46 grams (0.20 mole) of 3-chloro-2-(trichloromethyl)pyridine which was irradiated and heated in the temperature range of from about 120° to 130° C. The passage of chlorine was continued for about 5.75 hours to obtain 48.4 grams of crude 3,6-dichloro-2-(trichloromethyl)pyridine product. Vapor phase chromatographic analysis of the crude product indicated 79.6 percent to be the desired 3,6-dichloro-2-(trichloromethyl)pyridine product; this amounts to a yield of the desired product of 73 percent of theoretical. The product after recrystallization from hexane had a melting point of 47°–48° C.

Example 4.—3,6-dichloro-2-(trichloromethyl) pyridine

In a similar manner, 270 grams of 3-chloro-2-(trichloromethyl)pyridine reactant was heated and irradiated with a sun lamp and a stream of chlorine gas passed thereinto at a rate of 0.45 mole per hour for 15 hours. During this period, the temperature was maintained in the range of from 105° to 110° C. Whereupon a reaction took place with the formation of 294 grams of crude 3,6-dichloro-2-(trichloromethyl)pyridine product. Vapor phase chromatographic analysis of the crude product indicated a 92 percent conversion of the reacted 3-chloro-2-(trichloromethyl)pyridine into the desired product.

Example 5.—2,3-dichloro-6-(trichloromethyl) pyridine

In a similar manner, 60 grams of 5-chloro-2-(trichloromethyl)pyridine was chlorinated in the temperature range of from 120° to 130° C. by bubbling chlorine therethrough at a rate of 0.4 mole per hour for 2.5 hours to obtain a crude 2,3-dichloro-6-(trichloromethyl)pyridine product in a yield of 65 grams. The desired product constituted 64.5 mole percent of the product mixture as determined by vapor phase chromatographic analysis and was recovered from the mixture by fractional distillation. The 2,3-dichloro-6-(trichloromethyl)pyridine product was a white crystalline solid melting at 38° C.

Example 6.—2,3-dichloro-6-(trichloromethyl) pyridine

In a reaction carried out in a similar manner, chlorine gas at a rate of 1.8 mole per hour was bubbled through 350 grams (1.5 mole) of 5-chloro-2-(trichloromethyl) pyridine for five hours at 135° C. At the end of this period, the reaction mixture was fractionally distilled to obtain the desired 2,3-dichloro-6-(trichloromethyl)pyridine product in a yield of 278 grams or 69 percent of theoretical.

Example 7.—2,3,5-trichloro-6-(trichloromethyl) pyridine

In a similar manner, 43 grams (0.16 mole) of 3,5-dichloro-2-(trichloromethyl)pyridine was chlorinated in the temperature range of from 135° to 145° C. to obtain the desired 2,3,5-trichloro-6-(trichloromethyl)pyridine product. The conversion of reacted 3,5-dichloro-2-(trichloromethyl)pyridine to 2,3,5-trichloro-6-(trichloromethyl) pyridine was 50 percent. The product was recovered by fractional distillation and had a boiling point of 120° C. at 1 millimeter of mercury pressure.

At room temperature, 2,3,5 - trichloro-6-(trichloromethyl) pyridine is a white, crystalline material melting at 58°–59° C.

Example 8.—2,3,4,5-tetrachloro-6-(trichloromethyl) pyridine

In a similar manner, 40 grams (0.13 mole) of 3,4,5-trichloro - 2 - (trichloromethyl)pyridine was chlorinated while irradiating and heating with a sun lamp at about 150° C. by passing chlorine gas therethrough at a rate of about 0.5 mole per hour for 5 hours to obtain the desired 2,3,4,5 - tetrachloro-6-(trichloromethyl)pyridine product in a conversion of about 27 percent of the reacted 3,4,5-trichloro-2-(trichloromethyl)pyridine.

2,3,4,5 - tetrachloro-6-(trichloromethyl)pyridine is a white crystalline solid melting at 58°–60° C.

Example 9.—2,4-dichloro-6-(trichloromethyl) pyridine

In a manner similar to that previously described, 46 grams (0.2 mole) of 4-chloro-2-(trichloromethyl)pyridine is heated at about 130° C. and chlorine gas bubbled through the hot liquid at a rate of about 0.5 mole per hour for about 1.5 hours to obtain a 2,4-dichloro-6-(trichloromethyl)pyridine product. The latter is purified by fractional distillation and has a molecular weight of 265.5.

Example 10.—3,4,6-trichloro-2-(trichloromethyl) pyridine

In a similar manner, 53 grams (0.2 mole) of 3,4-dichloro-2-(trichloromethyl)pyridine is heated to 135° C. with an ultraviolet light source and chlorine gas bubbled through the liquid at a rate of about 0.4 mole per hour for three hours. The resulting mixture is then fractionally distilled to obtain the desired 3,4,6-trichloro-2-(trichloromethyl)pyridine product having a molecular weight of 300.

Example 11.—2,3,4-trichloro-6-(trichloromethyl) pyridine

In a similar manner, 106 grams (0.4 mole) of 4,5-dichloro-2-(trichloromethyl)pyridine is heated to 140° C. and chlorine gas bubbled through the liquid at a rate of 0.8 mole per hour for 3 hours while irradiating the reaction mixture with a sun lamp. At the end of this period, the mixture is fractionally distilled to obtain the desired 2,3,4-trichloro-6-(trichloromethyl)pyridine product having a molecular weight of 300.

Purified 2,3,4-trichloro-6-(trichloromethyl)pyridine has a melting point of 60.2° C.

The products prepared by the methods of the present invention have numerous utilities. They are, for example, useful as intermediates in the preparation of compounds suitable in agricultural applications. They are also useful as pesticides without further modification in such application as nematocides, fungicides, germicides, herbicides and insecticides. Demonstration of nematocidal utility for the 2-chloro-6-(trichloromethyl)pyridine compounds may be seen from the following representative operations. Separate aqueous compositions were prepared containing one of the following 2-chloro-6-(trichloromethyl) pyridine compounds: 2-chloro-6-(trichloromethyl)pyridine, 2,3-dichloro-6-(trichloromethyl)pyridine, 2,3,4,5-tetrachloro-6-(trichloromethyl)pyridine and 2,3,5-trichloro-6-(trichloromethyl)pyridine. These compositions were in separate operations contacted with larvae of root-knot nematode for 6 days at 80° F. and were found in each case to give complete controls of the nematode larvae.

Certain of the 2-chloro-6-(trichloromethyl)pyridine compounds have outstanding antimicrobial properties and are useful as germicides. In representative separate operations, 2,3-dichloro-6-(trichloromethyl)pyridine and 3,6-dichloro-2-(trichloromethyl)pyridine were dispersed in malt yeast agar medium to produce culturing media containing one of the 2-chloro-6-(trichloromethyl) pyridine compounds at a concentration of 100 parts per million by weight. The media were separately inoculated with *Pullularia pullulans* and *Candida pelliculosa* and incubated at 30° C. for three days. At the end of this period, complete inhibition of growth of the organisms were observed.

Some of the 2-chloro-6-(trichloromethyl)pyridine compounds are useful as insecticides. In representative separate operations, 100 percent kills of house flies and American cockroaches were obtained when contacted with compositions containing 500 parts per million by weight of 2-chloro-6-(trichloromethyl)pyridine.

Some of the 2-chloro-6-(trichloromethyl)pyridine compounds are useful as herbicides. For example, 2,3,5-trichloro-6-(trichloromethyl)pyridine is useful for such plant pests as crabgrass. In a representative operation, an aqueous composition containing 4000 parts by weight of the compound per million parts by weight of ultimate mixture when applied to the point of run-off to foliage of crab grass as an aqueous spray gave excellent kills of the crab grass whereas untreated check plots supported lush and abundant stands of grass. Other compounds such as 3,4,5,6-tetrachloro-2-(trichloromethyl)pyridine are useful for kills of such plant species such as bean, pigweed and foxtail plants.

The 2-(trichloromethyl)pyridine reactants employed in the process of the present invention may be prepared by the photochemical chlorination of α-picoline. Such chlorination may be carried out at a temperature of from about 50° to 150° C. in the presence of a small quantity of water by bubbling gaseous chlorine with gradual increase in temperature as the reaction proceeds. After completion of the reaction, the resulting mixture is fractionally distilled under reduced pressure to separate the desired reactants having the formula

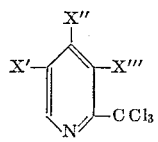

Certain of the 2-(trichloromethyl)pyridine reactants are preferably prepared by special methods. Thus, 4-chloro-2-(trichloromethyl)pyridine is preferably prepared (1) by heating picolinic acid with thionyl chloride for about twenty hours in a sealed tube or at reflux temperature for several days to produce the intermediate 4-chloro-picolinic acid (2) followed by heating the latter with phosphorus pentachloride at from about 200°–250° C. in the absence of solvent to produce the desired 4-chloro-2-(trichloromethyl)pyridine.

3,4-dichloro-2-(trichloromethyl)pyridine also is preferably prepared by a method other than the chlorination of α-picoline. 3,4-dichloro-2-(trichloromethyl)pyridine may be prepared by (1) refluxing 2,3,4-trichloropyridine with cuprous cyanide in an inert solvent to produce 3,4-dichloropicolinonitrile and 2,3-dichloropicolinonitrile, (2) separating the isomers by fractional crystallization, followed by hydrolyzing the 3,4-dichloropicolinonitrile under acid conditions to produce 3,4-dichloropicolinic acid, and (3) heating the acid with phosphorus pentachloride at elevated temperatures to produce 3,4-dichloro-2-(trichloromethyl)pyridine.

We claim:

1. A method for selectively producing a 2-chloro-6-(trichloromethyl)pyridine compound having the formula

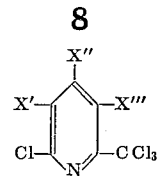

which comprises heating a 2-(trichloromethyl)pyridine compound having the formula

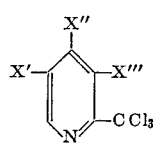

to a homogeneous liquid state in the absence of added water and polar solvent and passing gaseous chlorine thereinto while a sufficiency of heat is applied to maintain the reaction medium in a liquid state; wherein in the above formulas each of X′, X″ and X‴ is independently selected from the group consisting of hydrogen and chloro.

2. A method according to claim 1 wherein the heating is accomplished by an actinic light source.

3. A method according to claim 1 wherein such heat is applied as to maintain the temperature of the reaction medium in the range of from about 110° C. to about 160° C.

4. A method according to claim 1 wherein the 2-chloro-6-(trichloromethyl)pyridine compound is 2-chloro-6-(trichloromethyl)pyridine, the 2-(trichloromethyl)pyridine compound is 2-(trichloromethyl)pyridine and wherein such heat is applied as to maintain the temperature of the reaction medium in the range of from about 120° C. to about 135° C.

5. A method according to claim 1 wherein the 2-chloro-6-(trichloromethyl)pyridine compound is 3,6-dichloro-2-(trichloromethyl)pyridine, the 2-(trichloromethyl)pyridine compound is 3-chloro-2-(trichloromethyl)pyridine and wherein such heat is applied as to maintain the temperature of the reaction medium in the range of from about 105° C. to about 130° C.

6. A method according to claim 1 wherein the 2-chloro-6-(trichloromethyl)pyridine compound is 2,3-dichloro-6-(trichloromethyl)pyridine, the 2-trichloromethyl)pyridine compound is 5-chloro-2-(trichloromethyl)pyridine and wherein such heat is applied as to maintain the temperature of the reaction medium in the range of from about 120° C. to about 135° C.

7. A method according to claim 1 wherein the 2-chloro-6-(trichloromethyl)pyridine compound is 2,3,4,5-tetrachloro-6-(trichloromethyl)pyridine, the 2 - (trichloromethyl)pyridine compound is 3,4,5-trichloro-2-(trichloromethyl)pyridine and wherein such heat is applied as to maintain the temperature of the reaction medium in the range of from about 150° C. to about 160° C.

8. A method according to claim 1 wherein the 2-chloro-6-(trichloromethyl)pyridine compound is 2,3,5-trichloro-6-(trichloromethyl)pyridine, the 2-(trichloromethyl)pyridine compound is 3,5-dichloro-2-(trichloromethyl)pyridine and wherein such heat is applied as to maintain the temperature of the reaction medium in the range of from about 135° C. to about 145° C.

9. A method for selectively chlorinating 2-(trichloromethyl)pyridine to produce 2-chloro-6-(trichloromethyl)pyridine which comprises heating 2-(trichloromethyl)

pyridine to a temperature in the range of from about 120° C. to about 135° C. in the absence of added water and polar solvent and passing gaseous chlorine therethrough.

References Cited

UNITED STATES PATENTS

| | | | |
|---|---|---|---|
| 2,516,402 | 7/1950 | McBee, et al. | 260—290 |
| 2,679,453 | 5/1954 | Brett, et al. | 71—2.5 |
| 3,135,594 | 6/1964 | Goring | 71—11 |

OTHER REFERENCES

Sell, J. Chem. Soc. 87; 799–804 (1905).
Ochiai et al., C. A. 44; 5878 (1950).

HENRY R. JILES, *Primary Examiner.*

C. M. SHURKO, *Assistant Examiner.*

U.S. Cl. X.R.

204—158; 167—33; 260—295, 294.9